Patented Aug. 12, 1952

2,606,830

UNITED STATES PATENT OFFICE 2,606,830

STABLE CONCENTRATED HERBICIDAL COMPOSITIONS

Jonas Kamlet, New York, N. Y., and William T. McLaughlin, Pittsburgh, Pa., assignors to Pittsburgh Coke & Chemical Company, Pittsburgh, Pa., a corporation of Pennsylvania No Drawing. Application March 8, 1949, Serial No. 80,326

12 Claims. (Cl. 71—2.6)

The present invention relates to stable, concentrated, herbicidal compositions. More particularly, concentrates of weed-killing compounds which form stable, clear solutions when diluted with hard water prior to use.

Following the work of Zimmerman (Industrial and Engineering Chem. 35, 596–601 (1943) (Cold Spring Harbor Symposia 10, 152–157 (1942); Zimmerman and Hitchcock (Contributions from the Boyce Thompson Institute, 12, 321–343 (1942); Proceedings of the American Society for Horticultural Science, 45, 187–189 (1944); Contributions from the Boyce Thompson Institute 14, 21–38 (1945), and Jones (U. S. Patents 2,390,941 (December 11, 1945); 2,394,916 (February 12, 1946); 2,396,513 (March 12, 1946) and 2,412,510 (December 10, 1946), a new series of weed killing compounds was introduced, based on the mono-chlorinated, di-chlorinated and tri-chlorinated derivatives of aryloxyacetic acids. These weed-killing compounds have met with very widespread acceptance and, at the present time, are used to the extent of many tens of millions of pounds annually throughout the world. These compounds are chiefly 2,4-dichlorophenoxyacetic acid, 2-methyl, 4-chlorophenoxyacetic acid, 2,4,5-trichlorphenoxyacetic acid, 2,4,6-trichlorophenoxyacetic acid and the salts, esters and amides thereof.

The water-soluble salts of these mono-, di- and trichlorinated aryloxyacetic acids are usually applied to the weeds, foliage, brush, or the like, by spraying an aqueous solution thereof from a gardening can, knapsack sprayer, small tank sprayer, power sprayer, boom rig fitted with spray nozzles, aerial spraying from aircraft, etc. For purposes of convenience in preparing such sprays in the field immediately prior to spraying, it has become customary to market these chlorinated aryloxyacetic acids in the form of concentrates of a water-soluble salt thereof, said concentrates being diluted to the desired concentration in the field immediately prior to spraying. Thus, a large part of these chlorinated aryloxyacetic acids is now sold as concentrates of the sodium salt, ammonium salt, isopropylamine salt, triethanolamine salt, ethylamine salt, triethylamine salt, triisopropanolamine salt, morpholine salt, etc., said concentrates being diluted with water to the desired concentration (usually between 0.01% and 0.5% based on the chloroaryloxyacetic acid content) immediately prior to spraying.

As is well known, most of the ground water supplies in the United States and throughout the North American continent contain very considerable amounts of calcium and magnesium ions, ranging from several hundred to several thousand parts per million. Areas underlaid by limestone and dolomitic limestone formations produce particularly high concentrations of these ions in the ground water. Thus, when the concentrates of the water-soluble salts of the chlorinated aryloxyacetic acids are diluted with this "hard" water, there forms almost immediately a heavy, gelatinous precipitate of the water-insoluble calcium and magnesium salts of the chlorinated aryloxyacetic acids. This precipitate is highly undesirable. It clogs the nozzles of the sprayer, plugs pipes and orifices, results in uneven and spotty spraying and diminishes the effectiveness of the spray, since these insoluble salts of the chlorinated aryloxyacetic acids are poorly herbicidal. Occasionally, with very "hard" water, this gelatinous precipitate "sets up" so thickly, that the entire solution becomes a semi-solid mass which cannot be sprayed. This difficulty represents one of the major practical problems faced by the commercial sprayer, the gardener, horticulturist, farmer, greenskeeper and all other users of weed-killing compound concentrates in hard water areas.

Munz (U. S. Patent No. 2,240,957) has described a series of compounds, chief among which are nitrilotriacetic acid (N(CH₂COOH)₃) and ethylene bis-(iminodiacetic acid)

the water-soluble alkali metal salts of which have the property of binding or sequestering calcium and magnesium ions into water-soluble chelate structures. Thus, the latter compound, e. g., tetra-sodium ethylene bis-(iminodiacetate) forms water-soluble chelate compounds with calcium ions, in which the calcium ion is very poorly ionized:

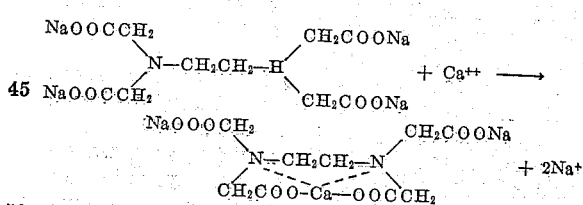

Similar chelate complexes are formed with magnesium ions, ferrous and ferric ions, cupric ions, nickel ions, manganese ions, and similar multivalent ions. These sequestering agents are now used in conjunction with soaps to impart stability to "hard" waters (Chwala, "Textilhilfsmittel," page 81 (1939); Zussman, Soap and Sanitary Chemicals, February 1948).

When attempts were made to inhibit the precipitation of the calcium and magnesium salts of the chlorinated aryloxyacetic acids upon dilution of the concentrates of the water-soluble salts with "hard" water, by the addition of the above-mentioned cation-sequestering agents of Munz, it was found that the protective effect was very slight for all practical purposes. Thus, a concentrate made with the triethylamine salt of 2,4-dichlorphenoxyacetic acid, upon dilution 1:10 with "hard" water containing 700 to 850 p. p. m. of calcium ion, showed a heavy precipitate in thirty to forty-five seconds. The addition of 2% of a 30% solution of tetra-sodium ethylene bis-(iminodiacetate) delayed this precipitate from forming for only three to five minutes. For all practical purposes, this delay in the formation of a precipitate is insufficient. The user will dilute the concentrate, and may not get around to using it immediately. A protective period of at least one to eight hours is, therefore, desirable.

A principal object of this invention is to provide a new method by which concentrates of chlorinated aryloxyacetic acid salts may be modified so that when they are diluted with hard water, they do not have any great tendency to form insoluble alkaline earth metal salts of the aryloxyacetic acid, but remain as a stable, sprayable solution for a substantial length of time, e. g., for one day, even with hard water having as high as 1500 p. p. m. of calcium ions. Still further objects include:

(1) The provision of new types of concentrated herbicidal compositions containing a predominant amount of a water-soluble salt of a chlorinated aryloxyacetic acid which can be diluted to form a spray solution with hard water without the formation of an alkaline earth metal salt precipitate of the aryloxyacetic acid within the time which is normally required to form and use the spray solution;

(2) The provision of new herbicidal sprays which are composed of a new combination of three essential and separate types of ingredients;

(3) The provision of a new combination of reagents which stabilize dilute aqueous solutions of aryloxyacetic acid salts against formation of precipitates of ions present in hard water;

(4) The provision of a new method for modifying the action of cation-sequestering agents.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished in accordance with the present invention by incorporating a cation-sequestering agent together with a surface-active agent into the solution of a water-soluble salt of a chlorinated aryloxyacetic acid during the formation of a dilute spray mixture from a more concentrated aqueous solution of the salt. Preferably, the cation-sequestering agent and the surface-active agent are mixed with a concentrated solution of the herbicidal salt to form a stable concentrate which is subsequently diluted as required in order to form the desired dilute, stable spray solution.

The success of the present invention is due to a large extent to the surprising discovery that the addition of a surface-active agent increases the protective action of cation-sequestering agents manifold, i. e., from several minutes to several hours.

The mechanism of this remarkable increase in the protective action of the cation-sequestering agents of Munz is uncertain. It is our opinion that our newly discovered process can be found in the irreversible insolubility of the calcium and the magnesium salts of the chlorinated aryloxyacetic acids. Once precipitated, these insoluble calcium and magnesium salts cannot be redissolved upon addition of a cation-sequestering agent. While the cation-sequestering agent almost completely inhibits the ionization of the calcium and magnesium ions, to a slight extent such ionization will still occur. The calcium and magnesium ions thus formed, will precipitate insoluble salts of the chlorinated aryloxyacetic acids. Thus removed from the field of reaction, more calcium and magnesium ions will ionize from the chelate complex, these will form an additional precipitate, and so forth, until the entire effect of the chelate cation-sequestering complex has been dissipated and the insoluble calcium and magnesium salts of the chlorinated aryloxyacetic acids will have formed in large amount.

The addition of a surface-active agent appears to serve to inhibit the formation of the first colloidal micelles of the insoluble salts of the chlorinated aryloxyacetic acids. By lowering the cohesive force between the first particles of the calcium and magnesium salts formed, and preventing these particles from aggregating and formiig a precipitate, the true cation-sequestering action of the agents of Munz can then be exerted. In other words, as long as the first formation of precipitate is avoided (by the addition of the surface-active agent), there is no tendency for the sequestering agent complex to loose the sequestered calcium and magnesium ions progressively, and thus give rise to the undesirable precipitates. As long as the initiation of the precipitation is avoided, no subsequent precipitation is observed.

A more complete comprehension of the new procedures of this invention and the unique compositions and products provided thereby may be had by reference to the following illustrative examples, in which all parts are by weight.

*Example I*

A concentrated herbicidal composition to be subsequently diluted with water to form a dilute herbicidal spray is made from the following ingredients:

43.00 parts of 2,4-dichlorophenoxyacetic acid
22.50 parts of 90% technical triethylamine
0.60 part of tetra sodium salt of ethylene bis-(iminodiacetic acid)
1.00 part of polyoxyethylene ether of sorbitan monoabietate are dissolved in 30.00 parts of water, and adjusted to pH 10 with triethylamine. Sufficient water is then added to bring the total weight up to 100.00 parts.

*Example II*

A concentrated herbicidal composition to be subsequently diluted with water to form a dilute herbicidal spray is made from the following ingredients:

19.80 parts of 2,4-dichlorphenoxyacetic acid
7.00 parts of morpholine
1.00 part of the trisodium salt of nitrilotriacetic acid
1.50 parts of the polyoxyalkylene ether of sorbitan monolaurate are dissolved in 65.00 parts of water and adjusted to pH 11.0 with morpholine. Sufficient water is then added to bring the total weight to 100.00 parts.

*Example III*

A concentrated herbicidal composition to be subsequently diluted with water to form a dilute herbicidal spray is made from the following ingredients:

40.00 parts of 2,4-dichlorphenoxyacetic acid
30.00 parts of 28% of aqua ammonia
1.00 part of tetra-potassium salt of ethylene bis-(iminodiacetic acid)
2.00 parts of the polyoxyalkylene ester of cocoanut oil fatty acids are dissolved in 20.00 parts of methanol. Sufficient aqua ammonia is added to bring the pH of the solution to 11.5, and water is then added to bring the total weight to 100.00 parts.

*Example IV*

A concentrated herbicidal composition to be subsequently diluted with water to form a dilute herbicidal spray is made from the following ingredients:

23.40 parts of 2,4,5-trichlorophenoxyacetic acid
14.80 parts of triethanolamine,
1.50 parts of tetra-sodium ethylene bis-(iminodiacetate)
10.00 parts of methanol
1.50 parts of polyalkylene oxide ester of palmitic acid are dissolved in 40 parts of water. Triethanolamine is added to adjust the pH to 10.5 and sufficient water is then added to bring the total weight to 100 parts.

*Example V*

This example illustrates the use of the concentrate of Example 1 in the formation of a dilute herbicidal spray using hard water.

One part of the herbicidal concentrate of Example 1 is diluted with 50 parts of hard water containing 500 p. p. m. of calcium ion. After thorough mixing of the ingredients, the spray solution is allowed to stand and the solution is observed to determine the time required for the formation of an appreciable quantity of a precipitate. The solution remains clear for more than 48 hours.

In another case, a herbicidal spray of the same concentration of 2,4-D salt is prepared from the same hard water, using a concentrate comparable to that of Example 1, with the exception that the sorbitan monoabietate derivative is omitted. A precipitate forms in the resulting solution in about 5 minutes.

In still another case, a dilute spray solution of the same concentration of the 2,4-D salt is prepared from the same hard water but the sorbitan monoabietate derivative and the ethylene bis-(iminodiacetic acid) salts are omitted. In this case, a precipitate forms in the solution in less than 1 minute.

Other actual experiments with various aryloxyacetic acid salts to produce dilute solutions with hard water have shown that without the addition of a cation-sequestering agent and a surface-active agent, a precipitate will result in the hard water in from 10 seconds to one minute. On the other hand, when solutions are formed from the herbicidal agent with the addition of a cation-sequestering agent, a precipitate is formed upon dilution with hard water in from 2 to 10 minutes. In contrast, with the formation of the dilute solutions from hard water with the incorporation of both a cation-sequestering agent and a surface-active agent precipitates do not form within six to more than fifty hours.

By the term "surface-active agent," as employed in this discussion, is meant any compound or substance which diminishes the surface tension of a solution or which diminishes the interfacial tension between two immiscible phases or between two or more phases in a multiphase system. It appears that substantially any type of material which comes within this definition can be used to advantage in accordance with the present invention. Examples of such matters include both the anionic and cationic surface agents, such as aryl sulfonic acid, sodium keryl benzene sulfonate, sodium isobutyl naphthalene sulfonate, sodium dioctyl biphenyl disulfonate, alkyl sulfates, e. g., sodium lauryl sulfate, diethanol amine steryl sulfate, and ammonium myristyl sulfate, alkyl sulfonates, e. g., sodium oleyl ethane sulfonate, and long-chain alkyl quaternary ammonium salts, e. g., cetyl pyridinium chloride.

However, we have found that the best protective action, i. e., the longest inhibitions of formation of precipitates with "hard" water, when used in conjunction with a water-soluble salt of nitrilotriacetic acid and ethylene bis-(iminodiacetic acid), are observed with the non-ionic surface-active agents. Among the non-ionic surface-active agents suitable for this purpose are the hexitan partial esters of the long-chain fatty acid esters, the hexitan partial esters of rosin acids, the hexitan partial esters of the long-chain fatty acids etherified by polyoxyalkylene glycol groups, the polyoxyalkylene ethers of hexitan partial esters of rosin acids, fatty acid alkylolamine condensates, diglycol esters of fatty acids, polyoxyalkylene derivatives of partial fatty acid or rosin acid esters of ethylene, propylene, diethylene or dipropylene glycols, polyethylene glycols, polyethylene glycol esters of fatty acids, polyethylene glycol ethers of fatty alcohols, etc.

The term "water-soluble salts" of chlorinated phenoxy-acetic acids, as used herein, is broad enough to include the alkali and alkaline earth salts, such as sodium, potassium, lithium, ammonium, the acid salts, such as the sodium and potassium acid salts, and the substituted organic ammonium salts, such as the salts of methylamine, trimethylamine, diethylamine, monoethanolamine, triethanolamine and isopropanolamine.

A representative list of compounds, which are particularly suitable for practicing the invention, includes:

2 - chloro-phenoxyacetic acid; 4 - chloro-phenoxyacetic acid; 2,4-dichlorophenoxyacetic acid; 2,4,5-trichloro-phenoxyacetic acid; 2,4,6-trichloro-phenoxyacetic acid; 2,3,4,6-tetrachloro-phenoxyacetic acid, pentachloro-phenoxyacetic acid; 3,4-dichloro-alpha-naphthoxyacetic acid; 3,4-dichloro-beta-naphthoxyacetic acid and 1,5,8-trichloro-beta-naphthoxyacetic acid.

The various proportions of the three essential ingredients of the present invention and the specific concentration of these reagents in the concentrated products provided by this invention are not critical and these proportions and concentrations may be varied to some extent, depending upon the specific reagents employed in the products and also the specific use to which the final sprays are to be put. However, we have found that under most general conditions, it is desirable to use a concentration of 20–95% by weight of the chlorinated aryloxyacetic acid in the original herbicide concentrate. In addition, it has been found generally preferable to have an amount of cation-sequestering agent between 0.3 and 2% by weight of the aryloxyacetic acid and between 0.5 and 5% of the surface-active agent by weight of the aryloxyacetic acid in the herbicidal compositions. Such concentrates can be diluted from 1:4 to 1:100 with water which may be as hard as 1500 p. p. m. of calcium ion (88 grains per U. S. gallon).

The discovery of the unique action of the surface-active agents, as described herein, appears to be generally applicable to cation-sequestering agents, but the invention is particularly applicable to the water-soluble salts of nitrilotriacetic acid and the ethylene bis-(iminodiacetic acid).

It has also been found that for maximum stability, it is desirable to adjust the concentrates containing the cation-sequestering agent and the surface-active agent to a pH in excess of 7.0. This is particularly true in those cases where the salt-forming base is volatile per se, as for instance, when concentrates are made with ammonia, ethylamine, triethylamine, morpholine, etc. Because of the well-known tendency of the salts of such volatile bases to dissociate, with the subsequent loss of the base by volatilization into the atmosphere, it is desirable to provide a slight excess of free amine in the formulation, to compensate for such possible losses of the volatile base. The presence of such free amine can be assured by adjusting the pH of the concentrate formulation to a pH above 7.0.

We claim:

1. A concentrated, herbicidal composition having a pH in excess of 7.0 containing a chlorinated aryloxyacetic acid capable of being diluted with water containing alkaline earth metal ions to form a diluted spray solution stabilized against forming an insoluble alkaline earth metal salt of the aryloxyacetic acid in an appreciable period of time which comprises 20 to 95% of a water-soluble amine salt of a chlorophenoxyacetic acid, 0.3 to 2.0% of a cation-sequestering agent of the general formula:

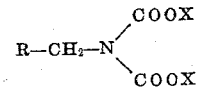

wherein R is a carboxylic group containing radical and X is a monovalent cation, and 0.5 to 5.0% of a non-ionic surface-active agent.

2. A concentrate as claimed in claim 1 wherein said cation-sequestering agent is a water-soluble amine salt of nitrilotriacetic acid.

3. A concentrate as claimed in claim 1 wherein said cation-sequestering agent is a water-soluble amine salt of ethylene bis-(iminodiacetic acid).

4. A concentrate as claimed in claim 1 wherein said surface-active agent is a long-chain fatty acid partial ester of hexitan.

5. A concentrate as claimed in claim 1 wherein said surface-active agent is a polyethylene glycol ester of a long-chain fatty acid.

6. A concentrate as claimed in claim 1 wherein said surface-active agent is a polyoxyalkylene ester of a long-chain fatty acid.

7. A concentrate as claimed in claim 1 wherein said surface-active agent is a polyoxyalkylene ether of sorbitan monoabietate.

8. A concentrate as claimed in claim 1 wherein said surface-active agent is the polyoxyethylene ether of sorbitan monolaurate.

9. A concentrate as claimed in claim 1 wherein said surface-active agent is a polyoxyalkylene ester of cocoanut oil fatty acids.

10. A concentrate as claimed in claim 1 wherein said chlorophenoxyacetic acid is 2,4-dichlorophenoxyacetic acid.

11. A concentrate as claimed in claim 1 wherein said chlorophenoxyacetic acid is 2,4,5-trichlorophenoxyacetic acid.

12. A concentrate as claimed in claim 1 wherein said chlorophenoxyacetic acid is 2-methyl-4-chlorophenoxyacetic acid.

JONAS KAMLET.
WILLIAM T. M'LAUGHLIN.

REFERENCES CITED

The following references are of record in the file of this patent:

UNITED STATES PATENTS

| Number | Name | Date |
|---|---|---|
| 2,240,957 | Munz | May 6, 1941 |
| 2,390,941 | Jones | Dec. 11, 1945 |
| 2,522,488 | Bersworth | Sept. 19, 1950 |

FOREIGN PATENTS

| Number | Country | Date |
|---|---|---|
| 598,484 | Great Britain | Feb. 19, 1948 |
| 483,873 | France | Aug. 17, 1917 |